United States Patent [19]

Kirkwood et al.

[11] Patent Number: 5,756,973
[45] Date of Patent: May 26, 1998

[54] BARBED SUSCEPTOR FOR IMPROVIING PULLOFF STRENGTH IN WELDED THERMOPLASTIC COMPOSITE STRUCTURES

[75] Inventors: Brad L. Kirkwood, Kent; Paul J. Patt, Bellevue, both of Wash.

[73] Assignee: The Boeing Company, Seattle, Wash.

[21] Appl. No.: 486,560

[22] Filed: Jun. 7, 1995

[51] Int. Cl.$^6$ ........................................................ H05B 6/10
[52] U.S. Cl. ........................ 219/634; 219/633; 219/645; 219/759; 156/272.4; 156/380.2
[58] Field of Search ................................. 219/630, 631, 219/632, 633, 621, 635, 634, 759; 156/273, 272.4, 380.2

[56] References Cited

U.S. PATENT DOCUMENTS

| | | |
|---|---|---|
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,423,922 | 7/1947 | Arndt . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 3,061,503 | 10/1962 | Gould et al. . |
| 3,101,403 | 8/1963 | Lewis et al. . |
| 3,183,460 | 5/1965 | Bennon . |
| 3,206,899 | 9/1965 | Wright . |
| 3,288,979 | 11/1966 | Mills et al. . |
| 3,395,261 | 7/1968 | Leatherman et al. . |
| 3,427,421 | 2/1969 | Matheson et al. . |
| 3,431,379 | 3/1969 | Yrene . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,091,254 | 5/1978 | Struve . |
| 4,120,712 | 10/1978 | Sindt . |
| 4,180,717 | 12/1979 | Lenk et al. . |
| 4,288,673 | 9/1981 | Ishibashi . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,355,222 | 10/1982 | Geithman et al. . |
| 4,382,113 | 5/1983 | Schwartz et al. . |
| 4,416,713 | 11/1983 | Brooks . |
| 4,421,588 | 12/1983 | Davies . |
| 4,445,951 | 5/1984 | Lind et al. . |

(List continued on next page.)

FOREIGN PATENT DOCUMENTS

| | | |
|---|---|---|
| 0 461 979 B1 | 4/1984 | European Pat. Off. . |
| 0158528 | 10/1985 | European Pat. Off. . |
| 54-25542 | 2/1979 | Japan . |
| 62-148243 | 12/1987 | Japan . |
| 2108425 | 5/1983 | United Kingdom . |
| 2132134 | 7/1984 | United Kingdom . |
| WO9319926 | 10/1993 | WIPO . |
| WO9615899 | 5/1996 | WIPO . |

*Primary Examiner*—Tu B. Hoang
*Attorney, Agent, or Firm*—John C. Hammar

[57] ABSTRACT

Thermoplastic welding is an emerging technology targeted at significantly reducing the manufacture of aerospace structure by eliminating fasteners and the touch labor associated with fasteners to prepare, install, and inspect the assemblies. Thermoplastic welds, however, suffer from low pulloff strength because the metal foil susceptor used to heat the bondline is essentially a foreign substance in the weld that is unreinforced. The susceptor of the present invention provides Z-direction barbs on the susceptor to increase the pulloff strength.

19 Claims, 2 Drawing Sheets

U.S. PATENT DOCUMENTS

| | | |
|---|---|---|
| 4,489,123 | 12/1984 | Schijve et al. |
| 4,521,659 | 6/1985 | Buckley et al. |
| 4,630,846 | 12/1986 | Nishino et al. |
| 4,653,396 | 3/1987 | Wennerberg |
| 4,671,470 | 6/1987 | Jonas |
| 4,673,450 | 6/1987 | Burke |
| 4,768,433 | 9/1988 | Boissevain |
| 4,791,260 | 12/1988 | Waldman |
| 4,822,972 | 4/1989 | Sugioka et al. |
| 4,865,674 | 9/1989 | Durkin |
| 4,897,518 | 1/1990 | Mucha et al. |
| 4,904,972 | 2/1990 | Mori et al. |
| 4,919,759 | 4/1990 | Ilmarinen et al. |
| 4,947,464 | 8/1990 | Mori et al. |
| 4,978,825 | 12/1990 | Schmidt et al. |
| 5,001,319 | 3/1991 | Holmstrom |
| 5,047,605 | 9/1991 | Ogden |
| 5,074,019 | 12/1991 | Link |
| 5,079,817 | 1/1992 | Anstotz et al. |
| 5,101,086 | 3/1992 | Dion et al. |
| 5,199,791 | 4/1993 | Kasanami et al. |
| 5,240,542 | 8/1993 | Miller et al. |
| 5,248,864 | 9/1993 | Kodokian |
| 5,250,776 | 10/1993 | Pfaffmann |
| 5,283,409 | 2/1994 | Brendel et al. |
| 5,313,034 | 5/1994 | Grimm et al. |
| 5,313,037 | 5/1994 | Hansen et al. |
| 5,486,684 | 1/1996 | Peterson et al. |

BARBED SUSCEPTOR FOR IMPROVING PULLOFF STRENGTH IN WELDED THERMOPLASTIC COMPOSITE STRUCTURES

REFERENCE TO RELATED APPLICATIONS

The present invention is related to the following, copending, commonly-assigned U.S. patent applications or U.S. patents:

U.S. Pat. No. 5,500,511 Tailored Susceptors for Induction Thermoplastic Welding, U.S. Pat. No. 5,508,496 Selvaged Susceptor for Thermoplastic Welding by Induction Heating, U.S. Pat. No. 5,486,684 Multipass Induction Heating for Thermoplastic Welding, U.S. Ser. No. 08/471,625 A Structural Susceptor for Thermoplastic Welding, and U.S. Ser. No. 08/469,986 A Reinforced Susceptor for Induction or Resistance Welding of Thermoplastic Composites all of which we incorporate by reference.

TECHNICAL FIELD

The present invention relates to a susceptor that provides improved pulloff strength to a thermoplastic weld

BACKGROUND ART

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding usually requires complicated surface pretreatments.

In contrast, composite welding, which eliminates fasteners, features the ability to join thermoplastic composite components at high speeds with minimum touch labor and little, if any, pretreatments. In our experience, the welding interlayer, called a susceptor, also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

The exponential decay of the strength of magnetic fields dictates that, in induction welding processes, the structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some case, destruction or denaturing of the resin. To avoid overheating of the outer plies and to insure adequate heating of the inner plies, a susceptor of significantly higher conductivity than the fibers is used to peak the heating selectively at the bond line of the plies when heating from one side. An electromagnetic induction coil on one side of the assembly heats a susceptor to melt and cure a thermoplastic resin (also sometimes referred to as an adhesive) to bond the elements of the assembly together. Often the current density in the susceptor is higher at the edges of the susceptor than in the center because of the nonlinearity of the coil. This problem typically occurs when using a cup core induction coil like that described in U.S. Pat. No. 5,313,037 and can result in overheating the edges of the assembly or underheating the center, either condition leading to inferior because of non-uniform curing. It is necessary to have an open or mesh pattern in the susceptor to allow the resin to bond between the composite elements of the assembly when the resin heats and melts.

U.S. Pat. No. 4,673,450 describes a method to spot weld graphite fiber reinforced PEEK composites using a pair of electrodes After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly is required in this process which limits its application.

Prior art disclosing thermoplastic welding with induction heating is illustrated by U.S. Pat. Nos. 3,966,402 and 4,120,712. In these patents, the metallic susceptors used are of a conventional type having a regular pattern of openings of traditional manufacture. Achieving a uniform, controllable temperature in the bondline, which is crucial to preparing a thermoplastic weld of adequate integrity to permit use of welding in aerospace primary structure, is difficult with those conventional susceptors, as we discussed and illustrated in our copending U.S. patent application Ser. No. 08/068,520.

Thermoplastic welding is a process for forming a fusion bond between two faying thermoplastic faces of two parts. A fusion bond is created when the thermoplastic on the surface of the two parts is heated to the melting or softening point and the two surfaces are brought into contact, so that the molten thermoplastic mixes, and the surfaces are held in contact while the thermoplastic cools below the softening temperature.

Simple as the thermoplastic welding process sounds, and easy as it is to perform in the laboratory on small pieces, however, it becomes difficult to perform reliably and repeatably in a real factory on full-scale parts to build a large structure such as an airplane wing box. The difficulty is in getting the proper amount of heat to the bondline without overheating the entire structure, and also in achieving intimate contact of the faying surfaces of the two parts at the bondline during heating and cooling despite the normal imperfections in the flatness of composite parts, thermal expansion of the thermoplastic during heating to the softening or melting temperature, flow of the thermoplastic out of the bondline under pressure, and then contraction of the thermoplastic in the bondline during cooling.

One technique for getting heat to the bondline in a thermoplastic assembly to be welded together is to include a conductive layer or article, known as a "susceptor", between the two surfaces to be welded, and to heat the susceptor by resistive heating so that the susceptor functions as a bondline heat source to melt or soften the thermoplastic in the bondline for fusion of the faying surfaces of the composite components to be joined. The electric current for heating the susceptor can be in the form of eddy currents generated inductively, as taught for example by U.S. Pat. Nos. 3,395,261 and 4,978,825, or it can be conducted directly to the susceptor through tabs or the like as shown in U.S. Pat. No. 5,313,034.

a. Moving Coil Welding Processes

In U.S. Pat. No. 5,500,511, we described a tailored susceptor for approaching the desired temperature uniformity. This susceptor relied upon carefully controlling the geometry of openings in the susceptor (both their orientation and their spacing) to distribute the heat evenly. For example, we suggested using a regular array of anisotropic, diamond shaped openings with a ratio of the length (L) to the width (W) greater than 1 to provide a superior weld over that achieved using a susceptor having a similar array, but one where the L/W ratio was one. By changing the length to width ratio (the aspect ratio) of the diamond-shaped openings in the susceptor, we achieved a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, we altered the current density in regions near the edges by increasing the foil density (i.e., the absolute amount of metal). Increasing the foil density along the edge of the susceptor increases the conductivity along the edge and reduces the current density and the edge heating. We increased foil density by folding the susceptor to form edge strips of double thickness or by compressing openings near the edge of an otherwise uniform susceptor. We found these susceptors difficult to reproduce reliably. Also, their use forced careful placement and alignment to achieve the desired effect.

The tailored susceptor for our earlier application was designed to use with the cup core of U.S. Pat. No. 5,313,037. With this coil, the magnetic field is strongest near the edges because the central pole creates a null at the center. Therefore, the susceptor is designed to counter the higher field at the edges by accommodating the induced current near the edges. The high longitudinal conductivity encourages induced currents to flow longitudinally.

Our selvaged susceptor for thermoplastic welding which is described in U.S. Pat. No. 5,508,496 controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil, because, with that coil, it provides a controllable area of intense, uniform heating, a trailing region with essentially no heating, and a leading region with minor preheating.

The power (P) or power density which the susceptor dissipates as heat follows the well-known equation for power loss in a resistor: $P=(J^2)(R)$ wherein J is the eddy current (or its density) and R is the impedance (i.e., resistance) of any segment of the eddy path. The heating achieved directly corresponds to the power (or power density).

We achieve better performance (i.e., more uniform heating) in rib welding by using a selvaged susceptor having edge strips without openings. The resulting susceptor, then, has a center portion with a regular pattern of opening and solid foil edges, which we refer to as selvage edge strips. We embed the susceptor in a thermoplastic resin to make a susceptor/resin tape that is easy to handle and to use in performing the composite pieces prior to welding. Also, we have discovered that, with a selvaged susceptor, the impedance of the central portion should be anisotropic with a lower transverse impedance than the longitudinal impedance. Here, the L/W ratio of diamond shaped openings should be less than or equal to one. That is, unlike our tailored susceptor of U.S. Pat. No. 5,500,511, L for the selvaged susceptor should be less than W. With this new selvaged susceptor in the region immediately under the asymmetric induction work coil described in U.S. Pat. No. 5,444,220, we encourage the current to flow across the susceptor to the edges where the current density is lowest and the conductivity, highest.

Generally, we form the selvaged susceptor somewhat wider so that the selvage edge strips are not in the bondline. We remove the selvage edge strips after forming the weld, leaving only a perforated susceptor foil in the weld. This foil has a relatively high open area fraction.

A structural susceptor allows us to include fiber reinforcement within the weld resin to alleviate residual tensile strain otherwise present in an unreinforced weld. The susceptor includes alternating layers of thin film thermoplastic resin sheets and fiber reinforcement (usually woven fiberglass fiber) sandwiching the conventional metal susceptor that is embedded in the resin. While the number of total plies in this structural sculptor is usually not critical, we prefer to use at least two plies of fiber reinforcement on each side of the susceptor.

The structural susceptor permits gap filling between the welded composite laminates which tailors the thickness (number of plies) in the structural susceptor to fill the gaps, thereby eliminating costly profilometry of the faying surfaces and the inherent problem of resin depletion at the faying surfaces caused by machining the surfaces to have complementary contours. Standard manufacturing tolerances produce gaps as large as 0.120 inch, which is too wide to create a quality weld using the conventional susceptors.

We can easily tailor the thickness of the structural susceptor to match the measured gap by scoring through the appropriate number of plies of resin and fiber reinforcement and peeling them off. In doing so, a resin side layer will be on both faying surfaces and this layer should insure better performance from the weld.

The need for a susceptor in the bondline poses many obstacles to the preparation of quality parts. The metal which is used because of its high susceptibility differs markedly in physical properties from the resin or fiber reinforcement, so dealing with it becomes a significant issue.

A reinforced susceptor overcomes problems with conventional susceptors by including the delicate metal foils (0.10–0.20 in wide×0.005–0.010 in thick; preferably 0.10× 0.007 in) in tandem with the warp fibers of the woven reinforcement fabric. The foil is always on the remote side of the fabric because it is between the warp thread and the weave threads. This arrangement holds the foils in place longitudinally in the fabric in electrical isolation from each other, yet substantially covering the entire width of the weld surface. This arrangement still allows adequate space for the flow and fusion of the thermoplastic resin. Furthermore, in the bondline, the resin can contact, wet, and bond with the reinforcing fiber rather than being presented with the resin-philic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement the foil can assume readily the contour of the reinforcement. Finally, the arrangement permits efficient heat transfer from the foil to the resin in the spatial region where the bond will form.

Significant effort has been expended in developing inductor and susceptor systems to optimize the heating of the bondline in the thermoplastic assemblies to be welded. Induction coil structures and tailored susceptors have now been developed that provide adequate control and uniformity of heating of the bondline, but a big hurdle remaining to perfecting the process to the point of practical utility for producing large scale aerospace-quality structures in a production environment is the aspect of the process dealing with the control of the surface contact of the faying surfaces of the two parts to be welded together, and the timing, intensity, and schedule of heat application so the material at the faying surfaces is brought to and maintained within the proper temperature range for the requisite amount of time for an adequate bond to form, and is maintained in intimate contact while the melted or softened material hardens in its bonded condition.

Large scale parts such as wing spars and ribs, and the wing skins that are bonded to the spars and ribs, are typically on the order of 20–30 feet long at present, and potentially, can be hundreds of feet in length when the process is perfected for commercial transport aircraft. Parts of this magnitude are very difficult to produce with perfect flatness. Instead, the typical part will have various combinations of surface deviations from perfect flatness, including large scale waviness in the direction of the major length dimension, twist about the longitudinal axis, dishing or sagging of "T" beam flanges, and small scale surface defects such as asperities and depressions. These irregularities interfere with full surface area contact between the faying surfaces of the two parts and result in surface contact only at a few "high points" across the intended bondline. Additional surface contact can be achieved by applying pressure to the parts to force the faying surfaces into contact, but full intimate contact is difficult or impossible to achieve in this way. Applying heat to the interface by electrically heating the susceptor in connection with pressure on the parts flattens the irregularities, but that time that is needed to achieve full intimate contact with the use of heat and pressure is excessive, and may result in deformation of the top part. When the overall temperature of the "T" beam flange is raised to the softening point, they will begin to yield or sag under the application of the pressure needed to achieve a good bond.

Our multipass thermoplastic welding process described in U.S. Pat. No. 5,486,684 enables a moving coil welding process to produce continuous or nearly continuous fusion bonds over the full area of the bondline to yield very high strength welds reliably, repeatably and with consistent quality. This process produces improved low cost, high strength composite assemblies of large scale parts, fusion bonded together with consistent quality, and uses a schedule of heat application that maintains the overall temperature of the structure within the limit in which it retains its high strength, so it requires no internal tooling to support the structure against sagging which otherwise could occur above the high strength temperature limit. The process also produces nearly complete bondline area fusion on standard production composite material parts having the usual surface imperfections and deviations from perfect flatness, while eliminating fasteners and the expense of drilling holes, inspecting the holes and the fasteners, inspecting the fasteners after installation, sealing between the parts and around the fastener and the holes; reducing mismatch of materials; and eliminating arcing from the fasteners.

In the process, an induction heating work coil is passed multiple times over a bondline while applying pressure in the region of the coil to the components to be welded, and maintaining the pressure until the resin hardens. The resin at the bondline is heated to the softening or melting temperature with each pass of the induction work coil and pressure is exerted to flow the softened/melted resin in the bondline and reduce the thickness of the bondline while improving the intimacy of the faying surface contact with each pass to militate for complete continuity of bond. The total time at the softened or melted condition of the thermoplastic in the faying surfaces is sufficient to attain deep inter diffusion of the polymer chains in the materials of the two faying surfaces throughout the entire length and area of the bondline. Doing so, produces a bondline of improved strength and integrity in the completed part. Because the total time of the faying surfaces at softened temperature is separated into several segments which allows time for the heat in the interface to dissipate without raising the temperature of the entire structure to the degree at which it loses its strength and begins to sag, so the desired shape and size of the final assembly is maintained.

b. Fixed Coil Induction Welding

We have also experimented with thermoplastic welding using our induction heating workcell and, of course, discovered that the process differs from the moving coil processes because of the coil design and resulting magnetic field. We believe that our fixed coil workcell presents promise for welding at faster cycle times than the moving coil processes because we can heat multiple susceptors simultaneously. We can reduce operations where the moving coil takes hours to minutes in the fixed coil. The keys to the process, however, are achieving controllable temperatures at the bondline in a reliable and reproducible process that assure quality welds of high bond strength. Our fixed coil induces currents to flow in the susceptor differently from the moving coils and covers a larger area. Nevertheless, we have developed processing parameters that permit welding with our induction heating workcell using a susceptor at the bondline.

Another advantage with the fixed coil process is that welding can occur using the same tooling and processing equipment that we use to consolidate the skin, thereby greatly reducing tooling costs. Finally, the fixed coil heats the entire bondline at one time to eliminate the need for skins that are currently used with the moving coil. We can control the temperature and protect against overheating by using our "smart" susceptors as a retort or as the bondline susceptor material or both.

These earlier susceptors were essentially planar (X-Y) structures or laminates of planar films. The welds lack reinforcement in the Z-direction, but welds can include such reinforcement (with corresponding improvement in the pulloff strength) if they incorporate a susceptor of the present invention.

SUMMARY OF THE INVENTION

The present invention uses, preferably, a Fe—Ni alloy susceptor that is formed to include barbed, Z-pin reinforcement to provide improved pulloff strength. The alloy chosen for this susceptor has a coefficient of thermal expansion (CTE) that essentially matches the CTE of the composite and a Curie temperature of about 700° F. (370° C.), which is essentially ideal for thermoplastic welding of resins like K3A. For this application an alloy of 42% Ni and includes $\gamma'$ strengthening elements of Al, Ti and Cb yields both low CTE and high strength. The susceptor is preferably made by laser cutting a foil of the material to form barbed tabs and pushing the cut tabs alternately up and down to give the susceptor a three dimensional character. Alternatively a woven wire mesh may be used in this application with alternating wires ending in the Z direction as shown in FIGS. 2 and 4. The thermoplastic resin cures or consolidates around the barbs during the welding process which provides the pulloff strength improvement.

DETAILED DESCRIPTION OF THE PREFERRED EMBODIMENT

First, we will describe a typical thermoplastic welding operation and then will describe our susceptor to improve pulloff strength.

For purposes of this description, "laminates" means a fiber-reinforced organic resin matrix composite having a plurality of plies of prepreg or its equivalent consolidated together and cured, as appropriate. The laminates are prefabricated by any appropriate means including automatic or hand type or tow fiber placement with autoclave consolidation and cure, resin transfer molding (RTM), or the like. Generally, the organic matrix resin is a thermoplastic, especially PEEK, PEKK, ULTEM, or K3. In the welding operation, resin in the laminates as well as resin in the susceptor melts, intermixes, and fuses to form the weld. The laminate might also be a thermoset in which case the welding process actually forms a hot melt adhesive bond rather than a weld. We prefer welding, but recognize the analogous process of adhesive bonding of thermosets.

In a thermoplastic laminate, the reinforcing fiber typically is carbon fiber in continuous or chopped form, and generally as tow or woven fabric. While other fibers can be used, modern aerospace requirements most often dictate carbon fibers for their strength and durability, and we prefer them. In thermosets, especially epoxy, the fibers might be graphite.

1. A Moving Coil Welding Operation

Figure 1:
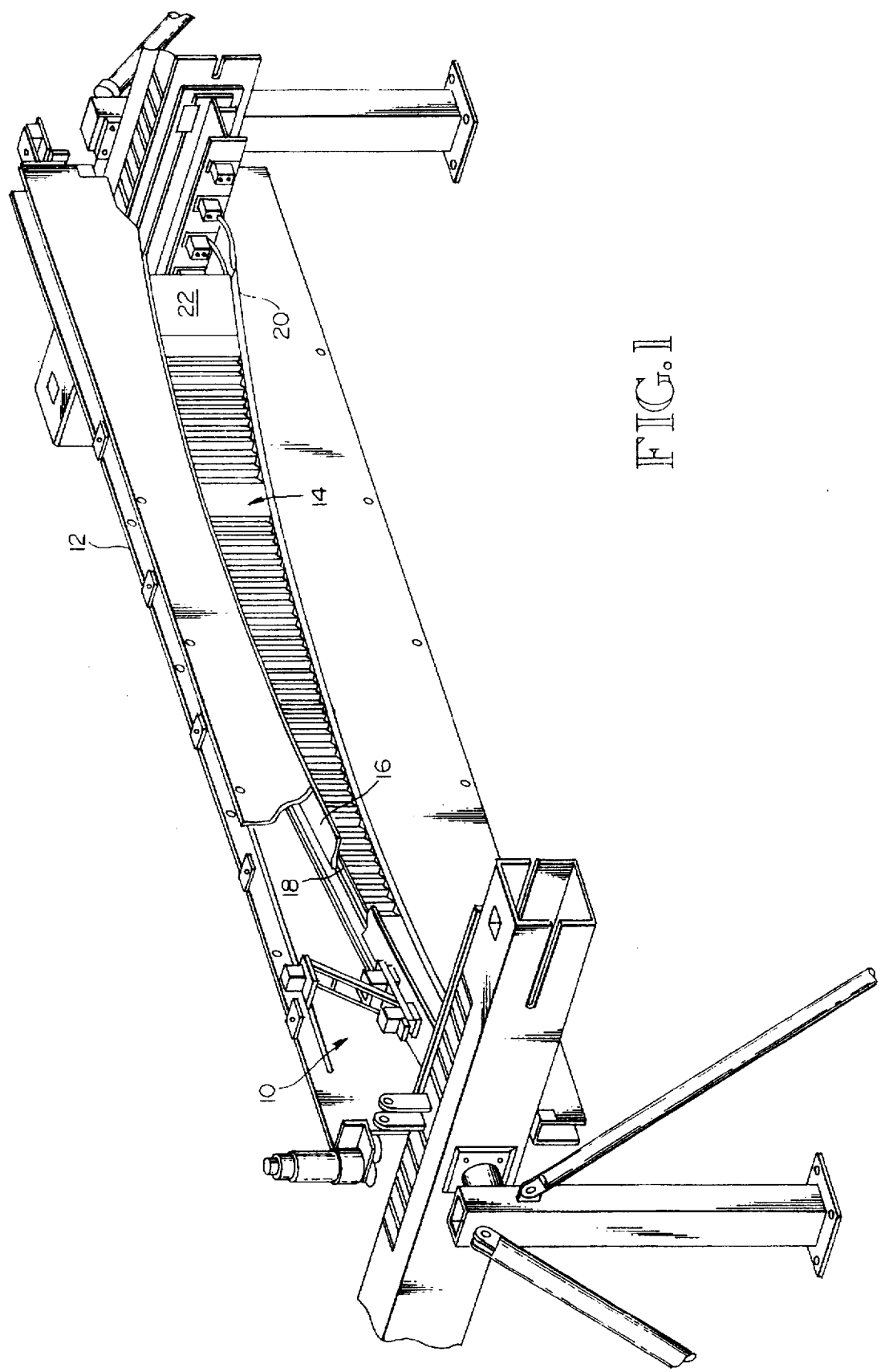
FIG. 1 is a perspective view of a moving coil thermoplastic welding apparatus.

Turning now to FIG. 1, a thermoplastic welding head 10 is supported on tooling headers 12 over thermoplastic composite parts to be fusion bonded together. The parts, in this example, include a thermoplastic spar 14 and a thermoplastic wing skin 16, only a small section of which is shown in FIG. 1. The spar 14 is in the form of an "T" beam having a top cap 18, a bottom cap 20, and a connecting web 22. The spar 14 extends lengthwise of the wing of the airplane for which the parts are being assembled, and the wing skin is bonded over the full length and surface area of the spar cap 18 with sufficient strength to resist the tensile and peeling forces the wing will experience in flight. The apparatus shown is more fully described in U.S. patent application Ser. No. 08/352,991 filed on Dec. 9, 1994, by John Mittleider and entitled "Thermoplastic Welding," which we incorporate by reference. The beams might be all composite construction or a hybrid metal webbed composite capped beam as described in U.S. Pat. No. 5,556,565, which we incorporate by reference. We could also join thermoset skins and spars with a hot melt thermoplastic adhesive.

A susceptor (i.e., a metal foil susceptible to induction heating encapsulated in a thermoplastic resin) is inserted between the spar cap 18 and the wing skin 16. Typically the resin is the same or a slightly lower melting temperature formulation of the same thermoplastic resin of the spar cap 18 and the lower faying surface of the wing skin 16.

The welding head 10 can be any moving coil apparatus that is capable of applying pressure during induction heating of the bondline to promote fusion and after heating for a period sufficient for the resin to cool and harden in its bonded condition. One suitable welding head is disclosed in an application by Karl Hansen entitled "Conformal Skate for Induction Welding," U.S. patent application Ser. No. 08/367, 545, which we also incorporate by reference. A preferred welding apparatus includes an induction coil for inducing eddy currents in the susceptor. The eddy currents heat the susceptor by electrical resistance heating and soften or melt the thermoplastic resin in the faying surfaces of the parts so it flows inter diffuses, and fuses together with softened resin of the wing skin and spar cap upon cooling. Two suitable induction coils are described U.S. Pat. No. 5,444,220 and U.S. Pat. No. 5,313,037, which we incorporate by reference. The coil shown in the '037 patent provides zero eddy current at the center with the current density increasing toward the edges. Use of a tailored susceptor is desirable to counterbalance the nonuniform eddy current density that the coil produces from centerline to edge to achieve uniform heating, and such a susceptor is disclosed in U.S. Pat. No. 5,500,511. A selvaged susceptor designed especially for use with the asymmetric induction coil is described in U.S. Pat. No. 5,508,496.

The induction work coil is mounted in the welding head in the center of a lower frame which is pinned to a link connecting the lower frame to an upper frame. The upper frame is pulled by a motive apparatus including a stepper motor driving a drive sprocket and a chain loop through a reduction gear unit. A pair of camroll bearings projects from both sides of the lower frame into cam grooves milled into the inside surfaces of the headers to guide and support the lower frame. A similar set of camroll bearings projects outward from the upper frame into a straight cam groove to guide the upper frame as it is pulled by the chain loop from one end of the wing skin to the other.

The process of welding the wing skin to the spar cap begins with assembling the parts together with the susceptor interposed between the faying surfaces of the parts. In the case of a wing box, this involves attaching the susceptor to the outer surfaces of the spar caps and then sandwiching the spars between the upper and lower wing skins. The parts are held in position and squeezed together by a force exerted by a pair of air bearing pads to which air under pressure is delivered by way of air lines and distributed to the air bearing pressure pads by separate air lines. The air to the pads reduces the frictional drag on the pressure pads on the top surface of the wing skin and helps to cool the parts after the coil has passed. The induction work coil is pulled along the intended bondline over the outer surface of the two wing skins in alignment with the susceptors while producing an alternating magnetic field which projects thorough the wing skins and around the susceptor, generating eddy currents in the susceptor. The eddy currents induced by the magnetic filed are of sufficient amperage to heat the susceptor, raising the temperature of the thermoplastic material in the faying surfaces to its softening or melting temperature. After the first pass of the welding head, the process is repeated three or more times, increasing the power to the coil after the second pass and, if desired, increasing the pressure exerted by air cylinders on the pressure pads.

The bond strength improves with repetitions of the welding passes of the welding head over the same bondline. This phenomenon was discovered fortuitously and was investigated in detail after it was identified. We found that the effect of multiple passes of the induction coil serves to create the optimal conditions for achieving a fusion bond with the desired characteristics of continuity over the entire bondline, and substantial molecular inter diffusion of the materials in the faying surfaces to produce a bondline of high pulloff strength with the complete or nearly complete absence of voids. We gain higher pulloff strengths using a barbed susceptor on the bondline.

The mechanisms for achieving a fusion bond include intimate contact and "healing." Intimate contact of the two faying surfaces is a function of force exerted on the parts to squeeze them together, and temperature-dependent viscosity. The force exerted on the parts is distributed over a certain surface area as interfacial pressure tending to bring the faying surfaces together, and the viscosity of the surface material is manifested by the tendency of high spots in the surface to yield of flow so that low spots in the two surfaces can come together. "Healing" is partly a process in which molten or soften materials flow together and blend where they come into contact, and partly a process of molecular penetration of the polymer chains in the material of one surface into the molecular matrix of the material in the other faying surface. The average penetration distance of the polymer chains, without the beneficial mixing effect achieved by flowing the materials in the faying surfaces, increases as a quarter power of time.

Objective and easily made observations of a bondline that are indicative of the quality of the bond are reduction in bondline thickness, improved ratio of bonded unbonded surface area in the bondline (or expressed conversely, a reduction of the amount of unbonded surface area in the bondline), and improved pass-through of a bonding resin through openings in the susceptor. These factors are easily measured by examining the welded part and then pull testing short sections to destruction, which also provides direct bond strength data.

Irregularities such as hollows, depressions and asperities (i.e., peaks) in the faying surfaces of the parts, and other deviations from perfect flatness can interfere with and prevent continues intimate contact along the full surfaces of the parts where bonding is intended. These deviations from perfect flatness include small scale surface features such as asperities, depressions or hollows, scratches and bumps, and also large scale features such as waviness in the direction of the major length dimension, twist about the longitudinal axis, dishing or sagging of "T" beam flanges, and warping such as humping or bowing in the longitudinal direction. The structural susceptor is particularly suited for dealing with these problems.

2. Our Susceptor

Our susceptor might be "tailored," "selvaged," "structural" or "reinforced" as those terms are defined in our earlier patent applications. If "reinforced" so that the foil strips run in tandem with warp fibers or warp tows, barb tabs only extend outwardly in the direction opposite the carbon fiber. Otherwise, the backs would tend to prop the foil away from the fiber. In this "reinforced" case, then, the susceptor has the configuration shown in FIG. 4.

Figure 2:
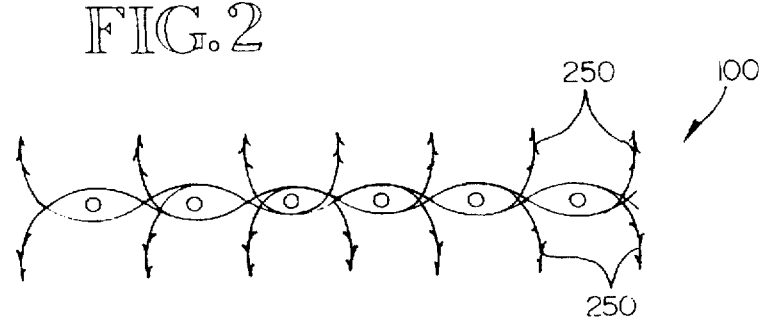
FIG. 2 is a schematic exploded sectional view of a typical structural susceptor of the present invention.
Figure 3:
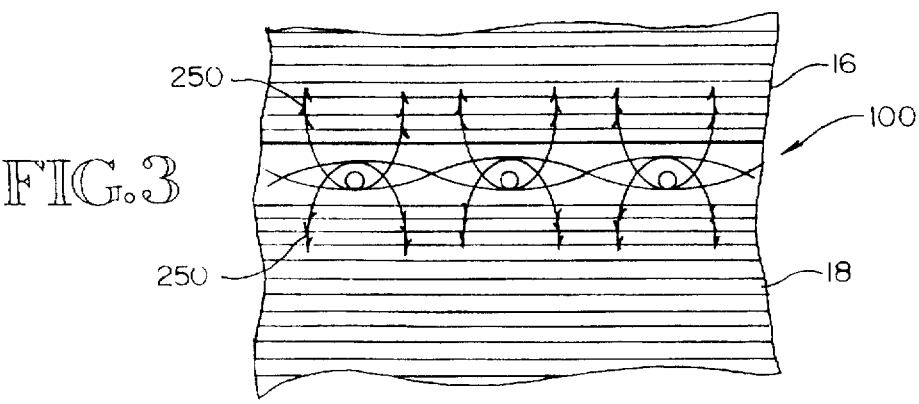
FIG. 3 is a schematic illustration of the susceptor of present invention in a thermoplastic weld.

Our susceptor usually is fabricated from an age-hardened Invar foil having a thickness of from 0.003–0.010 in (0.075–0.25 mm). Other materials having good electrical conductivity and high magnetic permeability (so that it is a good susceptor) may be used. Our susceptor 100 (FIG. 2) has a pattern of openings made by forming barbs 250 in the Z-axis by folding prongs out of the X-Y plane. The result is a susceptor (shown in FIGS. 2 or 4) that resembles barbed wire. Each prong of the susceptor might also be barbed like a fishhook. Such barbs are readily formed simply by scoring the prong with a cut that starts relatively closer to the body of the susceptor and extends into the prong at an angle running from the surface toward the tip The barbed susceptor may also have a pattern of openings in the X-Y plane with uniform line widths of about 7 mils (0.18 mm) to define the peripheries of the diamond, as our other susceptors do, so that a fusion bond can occur through the susceptor. Of course, the openings can have shapes other than diamonds. The diamonds are easy to form by etching, stamping, or expanding and provide a convenient mechanism to control the longitudinal and transverse impedance, as we described in our other patent applications. The diamonds can have L/W ratios less than or equal to 1.0 in our selvaged susceptor where we are interested in influencing the eddy currents to run transversely into the solid edge strips. If we use a cup coil of the '037 patent and a tailored susceptor, we want L/W to be greater than one so that the longitudinal impedance is less the impedance and the eddy currents turn longitudinally although the coil drives them transversely. Other shapes can be used for the openings to create a foil that has a uniform impedance or whatever desired ratio in the longitudinal and transverse directions. A laser cut diamond pattern with Z direction reinforcement tabs in an Invar foil sheet is shown in FIG. 5.

The barbed susceptor of the present invention might be a "reinforced" multistrip susceptor similar to that described in U.S. patent application Ser. No. 08/469,986 with the strips being periodically cut to create Z-plane barbs. This multistrip concept is what we prefer because it is the easiest to manufacture. Such a susceptor may actually be best suited for resistance welding like that described in U.S. patent application Ser. No. 08/470,168 or heating in our induction solenoid coil heating workcell for which we have numerous applications pending, because these two processes induce currents that run longitudinally through the susceptor. The multistrip susceptor has low longitudinal impedance.

Our goal is to produce aircraft structure that eliminates fasteners. Welded structure will be far less expensive because welding eliminates the labor to drill holes accurately and to inspect the fasteners after installation. We also will avoid other problems that fasteners introduce, such as sealing around the fastener and the holes, mismatch of materials, and arcing from the fasteners. To replace the fasteners, however, requires confidence that the welds are uniform and consistent, because a failure at any weak point in the weld could lead to catastrophic unzipping of the entire welded structure. The present invention provides improved pulloff strength. One of the most important problems with quality welding is temperature uniformity along the bondline to achieve uniform and complete melt and cure of the resin. The present invention addresses that problem as well by using a "smart" susceptor. Our barbed susceptor has a Curie temperature at one slightly higher than the welding temperature (i.e., about 700° F.) so the possibility of disastrous overheating is reduced.

We embed the foil in the resin to simplify the welding process. Making a foil/resin tape eliminates the steps of applying separate layers of resin between the respective elements in a composite-susceptor-composite assembly. It also ensures that there will always be adequate resin proximate the susceptor and essentially uniform resin thickness across the welding bondline. Our typical tape is about 2 inches wide with K3A Avimid resin (an aromatic polyimide), although we can use PEEK, PEKK, PES, PEK, or any other thermoplastic. The resin must be compatible with the matrix resin in the composite and generally is the same resin as the matrix resin when welding thermoplastic composites. For welding thermoset composites, the resin will likely be a comparable thermoplastic formulation of the matrix resin in the composites or a compatible resin.

To form a structural susceptor, we can take a barbed susceptor 100 of the present invention and loosely bond reinforcing fiber and thermoplastic films in alternating layers symmetrically on both sides, analogously to what we did in U.S. patent application Ser. No. 08/471,625. The fiberglass reinforcement prevents the resin from fracture under the residual strain left after welding. Higher ductility resins such as PEEK, PEK and Ultem also resist fracture better than some thermoplastics. The thermoplastic films are preferably the same resin as that used to embed the metal foil and to fabricate the laminates. Sheet thicknesses for these films are usually about 0.001–0.002 in (0.025–0.050 mm). The woven fibers are preferably oriented perpendicular and parallel to the longitudinal axis of the weld.

The structural susceptor is generally loosely bonded together by heat or pressure or both, but could be of essentially unitary construction if desired. Being loosely bonded helps in gap filling. We use at least two layers of fiber and thermoplastic on each side of the susceptor, but the absolute number is not critical. We have tested four different styles of fiberglass and achieved similar results with each, so we do not believe that the type or style of fiberglass is critical. We have tested four different styles of fiberglass and achieved similar results with each, so we do not believe that the type or style of fiberglass is critical.

The fiber suppresses cracking if the fiber volume is at least about 30%. The thermoplastic ensures a resin rich weld.

"Smart" susceptors described in greater detail in U.S. patent application Ser. No. 08/469,604 entitled Method for Achieving Thermal Uniformity in Induction Processing of Organic Matrix Composites or Metals, which we incorporate by reference. "Smart" susceptors are magnetic alloys that have high magnetic permeabilities but that also have their magnetic permeabilities fall to unity at their Curie temperature. At the Curie temperature, then, the susceptors become inefficient heaters. The alloys are selected to have curie points close to the process temperature of welding and have low thermal expansion coefficients to match composites. The preferable alloys for this application are in a composition range of from 36% Ni to 44% Ni in Fe. Additional alloying elements such as Al, Cb and Ti allow these low expansion iron-nickel alloys to be age hardened and add to the cap/skin pulloff strength.

While described with respect to a moving coil operation, the present invention is applicable to fixed coil welding operations that use an embedded susceptor. In such operations, particularly those using Boeing's induction heating workcell as described in, among others, U.S. patent application Ser. No. 08/169,655 by Matsen et al. entitled "A Method and Apparatus for Consolidating Organic Metric Composites Using Induction Heating" (which we incorporate by reference). A typical welding operation is described in U.S. patent application Ser. No. 08/471,053 by Matsen et al. entitled "Thermoplastic Welding of Organic Resin Composites Using a Fixed Coil Induction Heater", which we also incorporate by reference.

Figure 4:
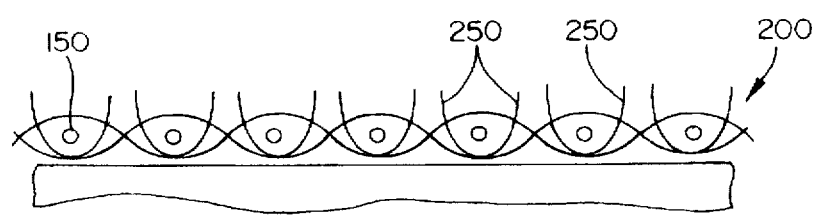
FIG. 4 is a schematic illustration of an alternative embodiment of the susceptor of FIG. 2, especially adapted for brazing to a titanium spar cap to permit stronger welds between a hybrid beam and a wing skin.
Figure 5:
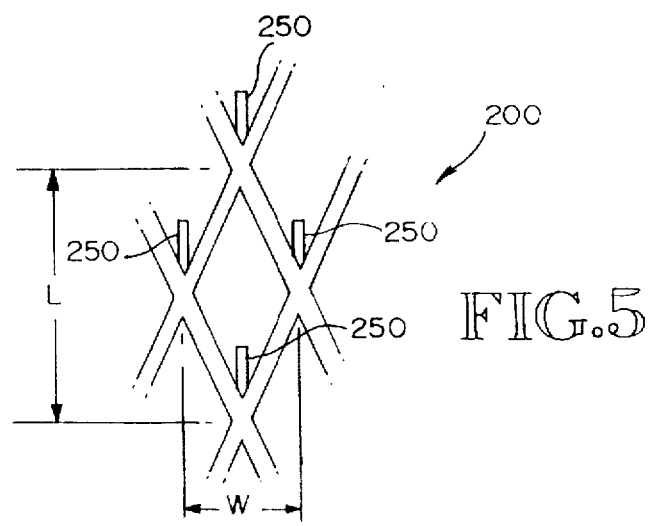
FIG. 5 is a schematic plan view of a "tailored" susceptor with tabs ready for folding.

As shown in FIG. 4, the barbed susceptor 200 can be fashioned so that each prong 250 projects upwardly. The susceptor is flat on one side and rough because of the prongs on the other. In this case, the susceptor can be brazed or spot welded to the metal web of the hybrid beam we described in U.S. Pat. No. 5,556,565, which we incorporate by reference.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and are not intended to limit it. Accordingly, limit the claims only as necessary in view of the pertinent prior art.

We claim:

1. A barbed susceptor to improve pulloff strength to a thermoplastic weld between at least two, prefabricated, fiber-reinforced resin composites, comprising:
   (a) a susceptor defining an X-Y plane in a bondline at the weld, capable of heating through eddy current circulation induced by a time varying magnetic fields and having uniformly in the X-Y plane;
   (b) a thermoplastic resin encasing the susceptor; and
   (c) a plurality of barbs attached to the susceptor and distributed substantially projecting generally in a Z-direction, some barbs projecting above the X-Y plane while other barbs project below the X-Y plane, all the barbs being substantially perpendicular to the X-Y plane to provide Z-direction reinforcement.

2. The barbed susceptor of claim 1 wherein the thermoplastic resin encasing the susceptor is the same thermoplastic material as the resin in the composites.

3. The barbed susceptor of claim 1 further comprising fiber reinforcement between the susceptor and the composites.

4. The barbed susceptor of claim 3 wherein the fiber reinforcement is fiberglass so that the weld has a higher coefficient of thermal expansion than the composites, wherein the fiber reinforcement alleviates residual tensile strain in the weld.

5. The barbed susceptor of claim 4 wherein the susceptor is a Ni—Fe alloy having a coefficient of thermal expansion that essentially matches a coefficient of thermal expansion of the composites and has a Curie temperature of no more than about 700° F.

6. The barbed susceptor of claim 1 wherein each barb is scored.

7. The barbed susceptor of claim 1 made from a metal having a Curie temperature of about 700° F.

8. The barbed susceptor of claim 1 made from a Ni—Fe alloy.

9. The barbed susceptor of claim 1 wherein the thermoplastic resin is polyimide, PEEK, PEKK, PES, or PEK.

10. The barbed susceptor of claim 1 wherein the susceptor and the barbs are a unitary construction fashioned from a single piece of metal.

11. A barbed susceptor to improve pulloff strength of thermoplastic weld between at least two, prefabricated, fiber-reinforced resin composites, comprising:
    (a) a susceptor defining an X-Y plane in a bondline at the weld and capable of heating through eddy current circulation induced by a time varying magnetic field;
    (b) a plurality of barbs attached to the susceptor and projecting generally in a Z-direction, the susceptor having a coefficient of thermal expansion that essentially matches a coefficient of thermal expansion of the composites; wherein some barbs project substantially perpendicular to the X-Y plane above the X-Y plane while other barbs project substantially perpendicular to the X-Y plane below the X-Y plane.

12. The barbed susceptor of claim 11 wherein the susceptor and the barbs are metal.

13. The barbed susceptor of claim 12 wherein the susceptor and the barbs are a unitary construction.

14. The barbed susceptor of claim 12 wherein the metal is a Ni—Fe alloy having a Curie temperature of about 700° F. to reduce the possibility of overheating the weld.

15. A thermoplastic weld, comprising:
    (a) at least two, prefabricated, thermoplastic resin composites defining a bondline in an X-Y plane; and
    (b) a susceptor along the bondline, the susceptor being capable of heating to a curing temperature of the thermoplastic resin in the composites when influenced by a time-varying magnetic field and having a plurality of spaced barbs distributed over the susceptor and extending into a Z-direction generally perpendicular to said X-Y plane in sufficient areal density to improve the pulloff strength of the weld.

16. The weld of claim 15 further comprising a thermoplastic resin encasing the susceptor.

17. The weld of claim 15 further comprising fiber reinforcement in the weld between the susceptor and the composites, wherein the fiber reinforcement is fiberglass so that the weld has a higher coefficient of thermal expansion than the composites and the fiber reinforcement alleviates residual tensile strain in the weld.

18. The weld of claim 17 wherein the thermoplastic resin is polyimide.

19. The weld of claim 15 wherein the thermoplastic resin is polyimide.

* * * * *

UNITED STATES PATENT AND TRADEMARK OFFICE
CERTIFICATE OF CORRECTION

PATENT NO : 5,756,973

DATED : May 26, 1998

INVENTORS : Brad L. Kirkwood
Paul J. Patt

It is certified that error appears in the above-identified patent and that the Letters Patent is corrected as shown below:

In column 12, claim 1, lines 50 - 51, please delete "and having uniformly in the X-Y plane".

Signed and Sealed this

Sixth Day of March, 2001

Attest:

NICHOLAS P. GODICI

Attesting Officer

Acting Director of the United States Patent and Trademark Office